Aug. 20, 1935.  H. S. LITTLEFIELD  2,011,817
FLEXIBLE COUPLING FOR VEHICLES
Filed Jan. 27, 1934
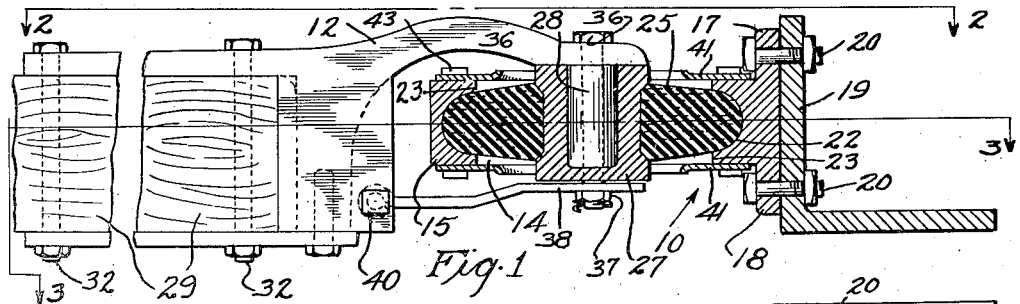
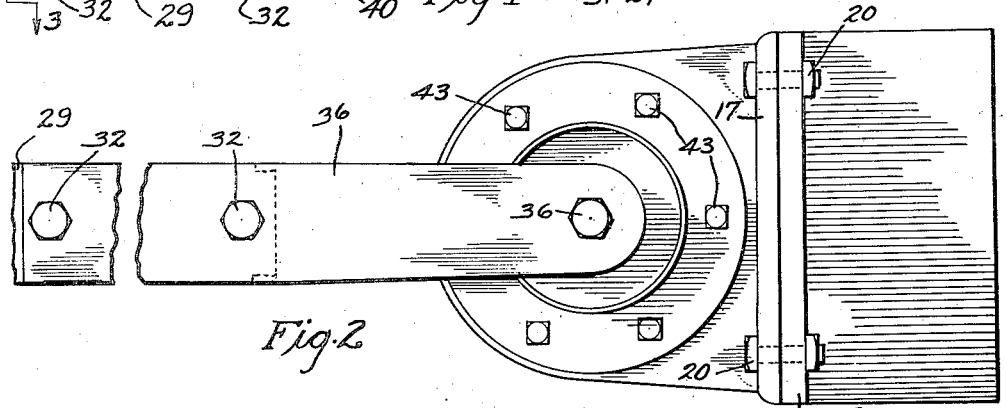
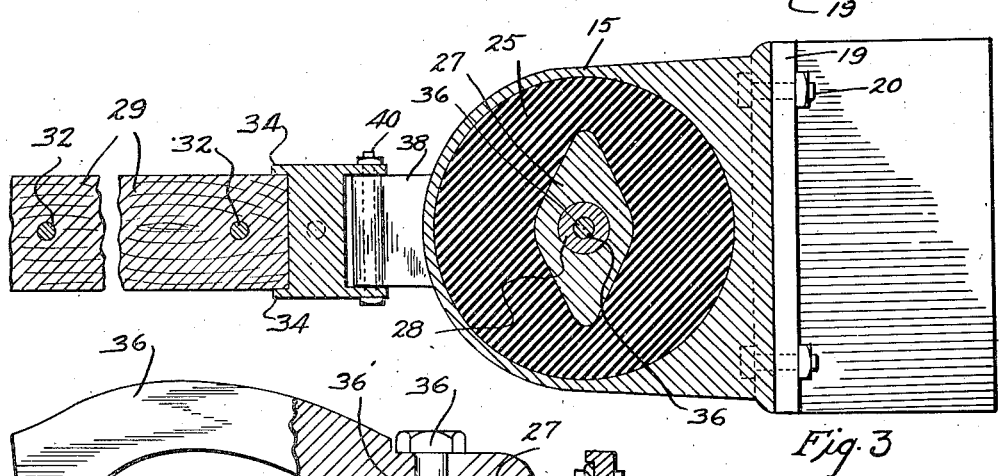
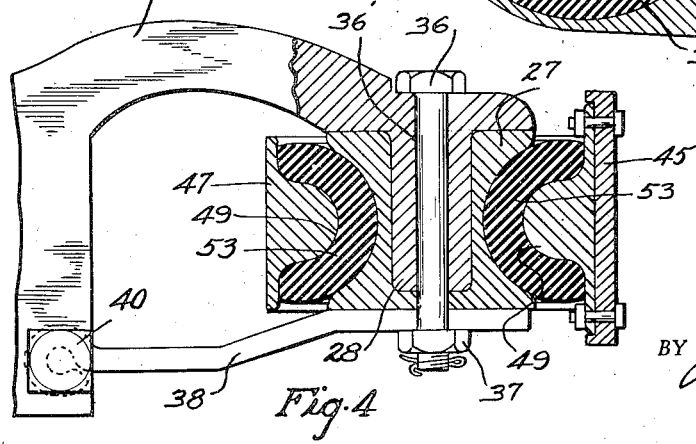
INVENTOR.
Henry S. Littlefield
BY
ATTORNEY Patented Aug. 20, 1935

2,011,817

UNITED STATES PATENT OFFICE 2,011,817

FLEXIBLE COUPLING FOR VEHICLES

Henry S. Littlefield, San Bernardino, Calif.

Application January 27, 1934, Serial No. 708,615

3 Claims. (Cl. 280—33.15)

The device herein shown and described is primarily intended for coupling trailers to automobiles and/or trucks, but it will be obvious that the coupling is well adapted for hitching other types of drawn equipment to automotive driven vehicles, for example, various types of farm equipment can be coupled to tractors, mine cars to mine locomotives, etc.

With the foregoing data in mind, it is a prime object of this invention to provide, a sturdy, compact, yet flexible coupling for drawn and driven vehicles or other equipment.

Another object of the invention is to provide a coupling that can be readily attached to equipment previously in use.

Another object of the invention is to provide a coupling that can be readily placed in use and that requires a minimum of inspection and upkeep.

A further object of the invention is to provide a coupling that is sturdy, simple in construction, reliable in operation and relatively inexpensive to build.

In the drawing, one sheet.

Figure 1 is a longitudinal sectional elevation showing the coupler construction and the draw bars of the drawn and driven vehicles.

Figure 2 is a plan view taken on line 2—2, Figure 1, showing coupler construction.

Figure 3 is a transverse section taken on line 3—3, Figure 1, showing construction detail.

Figure 4 is a longitudinal sectional elevation showing a modified type of coupler and its construction.

In the drawing, the reference character 10 indicates the device of this invention, and as shown in the several figures of the drawing, comprises a male sector 12 and a female sector 14.

The sector 14 is formed of a metal ring 15 having flanges 17 and 19 which are secured to a fitting 19 by means of bolts 20. The fitting 19 is adapted to be secured to a driven vehicle, no part of which is shown, for the reason that it forms no part of the present invention.

The ring 15 is provided with an annular groove 22 on its inner face 23 and is adapted to receive and support a moulded rubber disc 25.

A hub 27 is vulcanized within the disc 25 and is adapted to receive the swivel pin 28 of the male sector 12. The sector 12 is secured to the tongue or draw bar 29 of the drawn vehicle, which is not shown in the drawing for the reason pointed out above.

The sector 12 is secured to the tongue or draw bar 29 by means of bolts 32. The intermediate body section of sector 12 is provided with flanges 34 which lap over the sides of the draw bar 29 and further aids the bolts 32 in securing the sector 12 to the bar 29. An overhanging arch 36, bridges one half of the sector 14 and is formed integral with swivel pin 28.

A bolt 36 is fitted vertically and centrally of the hub 27 and pin 28 and is adapted to hold a keeper 38 in position, thereby preventing any possibility of the pin 28 jumping out of hub 27. The keeper 38 is hinged in the intermediate body of sector 12 by means of a bolt or rivet 40.

Annular plates 41 secured to the ring 15 by means of cap screws 43 provide added safety in that they are so positioned as to support the rubber disc 25 if, for any reason it should become dislodged from its annular groove base.

In Figure 4, a modified form of coupler construction is shown. As will have been noted, the structure previously described essentially provides a support in which the load is suspended in the center of a rubber cushion, whereas, in the modified form of structure now to be described the load is directly supported upon a rubber cushion interposed as a pad between the load and its support.

In the drawing, 45 indicates a fitting adapted to be secured to the driven vehicle and provides a point for attachment for a circular fitting 47 having a centrally positioned half round flange 49 projecting inwardly from the walls thereof. A hub 27, as above described is centrally aligned within fitting 47, after which a rubber cushion 53 is moulded and vulcanized in the intervening space. The swivel pin 28, arch 36 and keeper 38 are similar to the structure previously described, in connection with Figures 1-2 and 3.

It will be apparent that the modified form of coupling just described is primarily adapted to heavy duty and that while it makes an ideal coupling it is not, and inherently can not be resilient and flexible as the type of structure shown in Figures 1-2 and 3.

Applying the present invention to present day vehicles is but a matter of fundamental mechanics and to use the invention, it is only necessary to place the swivel pin 28 within the hub 27, after which bolt 36 is dropped into opening 36', the keeper 38 is swung upward over bolt 36 and nut 37 is screwed onto bolt 36 to retain the keeper in position.

In use the above described coupling presents a very strong, compact, quiet, yet flexible arrangement that will adequately meet every requirement of the trade.

When the driven vehicle is moved, the inertia of the drawn vehicle must be overcome by the power of the driven vehicle, and of course is overcome, but during the interval between applying power to the driven vehicle and moving the drawn vehicle, the rubber disc 25 is compressed to a degree proportional to the starting resistance of the drawn vehicle. All resistance is transmitted from the swivel pin 28 to the hub 27 which as shown in Figure 3 is elongated in order to spread the pressure of starting resistance over a greater area or section of the rubber disc 25.

There is a point at which further compression of the disc 25 is more difficult than starting the drawn vehicle, from that point on the driven and drawn vehicles move in unison.

The rubber disc affords lateral flexibility to take care of road irregularities with the result that loads can be drawn with a minimum of anxiety, mechanical shock, noise and expense for upkeep.

In the form of the invention shown in Figure 4 the load bearing down upon arch 36 is transmitted to hub 27 which causes the annular rubber ring 53 to be compressed between the hub 27 and the half round flange 49 of fitting 45. The application of longitudinal pressure obtains results, much in the manner described for that form of the invention shown in Figures 1-2 and 3.

Antifriction bearings could well be placed between the hub 27 and the hub contacting surface of arch 36 to reduce friction when turning, but as the use of such means are old in the art, they have not been shown and for the further reason that it is desired to keep the drawing as clear, simple and unambiguous as possible.

Having thus described the preferred form of my invention, I wish it to be known that I claim as part of the invention herein all such changes, modifications and variations of structure as clearly fall within the scope of the invention herein set forth.

I claim:

1. In combination with drawn and driven vehicles, means to couple said vehicles, said means comprising a metallic base secured to said driven vehicle, a rubber disc moulded in said base, a metallic bearing moulded in said rubber disc, the axis of which is centrally and transversely aligned across said disc, an interlocking device secured to said drawn vehicle, means on said interlocking device to cooperate with said bearing and disc whereby said drawn and driven vehicles will be swivelly joined, and guard plates to prevent dislodgment of said rubber disc.

2. In a coupling, a male sector and female sector, said male sector having means whereby it can be secured to the draw bar of a drawn vehicle, a swivel pin, said pin being integral with said male sector, said female sector being a metallic base ring having an inner annular grooved wall, a bearing, moulded rubber joining said base ring and said bearing, said bearing being adapted to receive said swivel pin to form a flexible union between said sectors, means formed integral with said bearing to spread pressure of load inertia throughout said disc, guard plates to prevent dislodgment of said rubber disc, and a keeper to prevent said sectors from being accidentally disjoined.

3. A coupling comprising a base having an annular seat, a bearing, a rubber disc moulded in said annular seat and joining said bearing, a connector adapted to cooperate with said coupling, said connector having a swivel pin adapted to be journalled in said bearing, means formed integrally with said bearing to spread the pressure of load inertia throughout said disc, and a keeper to prevent accidentally disjoining said connector and said coupling.

HENRY S. LITTLEFIELD.